(12) United States Patent
Inomata et al.

(10) Patent No.: US 11,248,726 B2
(45) Date of Patent: Feb. 15, 2022

(54) JOINT STRUCTURE

(71) Applicant: KAWASAKI JUKOGYO KABUSHIKI KAISHA, Kobe (JP)

(72) Inventors: Akihiko Inomata, Kobe (JP); Shuntaro Unno, Kobe (JP); Tomonori Takase, Kakogawa (JP); Tomoaki Umemura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 523 days.

(21) Appl. No.: 16/093,137

(22) PCT Filed: Apr. 10, 2017

(86) PCT No.: PCT/JP2017/014652
§ 371 (c)(1),
(2) Date: Oct. 11, 2018

(87) PCT Pub. No.: WO2017/179530
PCT Pub. Date: Oct. 19, 2017

(65) Prior Publication Data
US 2019/0331268 A1 Oct. 31, 2019

(30) Foreign Application Priority Data
Apr. 11, 2016 (JP) .............................. JP2016-078607

(51) Int. Cl.
*F16L 23/032* (2006.01)
*F16L 23/12* (2006.01)
(Continued)

(52) U.S. Cl.
CPC .............. *F16L 23/032* (2013.01); *F16L 23/12* (2013.01); *F16L 39/04* (2013.01); *F16L 59/065* (2013.01); *F16L 59/141* (2013.01); *F16L 59/18* (2013.01)

(58) Field of Classification Search
CPC ......... F16L 23/032; F16L 23/12; F16L 39/04; F16L 59/065; F16L 59/141; F16L 59/18;
(Continued)

(56) References Cited

U.S. PATENT DOCUMENTS 3,151,355 A * 10/1964 Ramsey ......................... 285/24
4,330,140 A * 5/1982 Hampton ........................ 285/39
(Continued)

FOREIGN PATENT DOCUMENTS

EP 2722480 A1 4/2014
JP 5415090 B2 2/2014
(Continued)

*Primary Examiner* — Matthew Troutman
*Assistant Examiner* — William S. Choi
(74) *Attorney, Agent, or Firm* — Oliff PLC

(57) ABSTRACT

A joint structure connecting a first and second double pipe, includes a male bayonet at an end portion of one of the pipes, the male bayonet including a first flange; a female bayonet at an end portion of the other of the pipes, the female bayonet including a second flange fastened to the first; a first positioning member mounted on the first double pipe; a second positioning member mounted on the second double pipe, the second positioning member being positioned with respect to the first so that a center axis of the male bayonet and the female bayonet conform to each other; and a slide mechanism which supports the first positioning member so the first positioning member is slidable in an axial direction of the first double pipe or supports the second positioning member so the second positioning member is slidable in an axial direction of the second double pipe.

5 Claims, 11 Drawing Sheets

(51) Int. Cl.
*F16L 39/04* (2006.01)
*F16L 59/14* (2006.01)
*F16L 59/18* (2006.01)
*F16L 59/065* (2006.01)

(58) Field of Classification Search
CPC ..... F16L 3/00; F16L 3/01; F16L 3/015; F16L 3/18; F16L 51/00; F16L 27/00; F16L 3/16; F16L 23/02; F16L 27/08; F16L 27/0861; F16L 27/1012; F16L 37/56; F16L 7/02; F16L 39/005; F16L 27/12; F16L 27/12751; B23P 19/04
USPC ................. 285/47, 24, 27, 39, 405, 412, 904
See application file for complete search history.

(56) References Cited

U.S. PATENT DOCUMENTS

| | | | |
|---|---|---|---|
| 4,769,889 A * | 9/1988 | Landman | |
| 5,181,748 A * | 1/1993 | Poldervaart | ..................... 285/24 |
| 6,290,434 B1 * | 9/2001 | Celada-Gonzalez | ... F16L 51/00 |
| 6,467,811 B2 * | 10/2002 | Mitchell | ................. F16L 23/02 |
| | | | 285/412 |
| 6,513,837 B2 * | 2/2003 | Fujikawa | ..................... 285/904 |

FOREIGN PATENT DOCUMENTS

| | | |
|---|---|---|
| WO | 2004/106696 A1 | 12/2004 |
| WO | 2016/051770 A1 | 4/2016 |

* cited by examiner

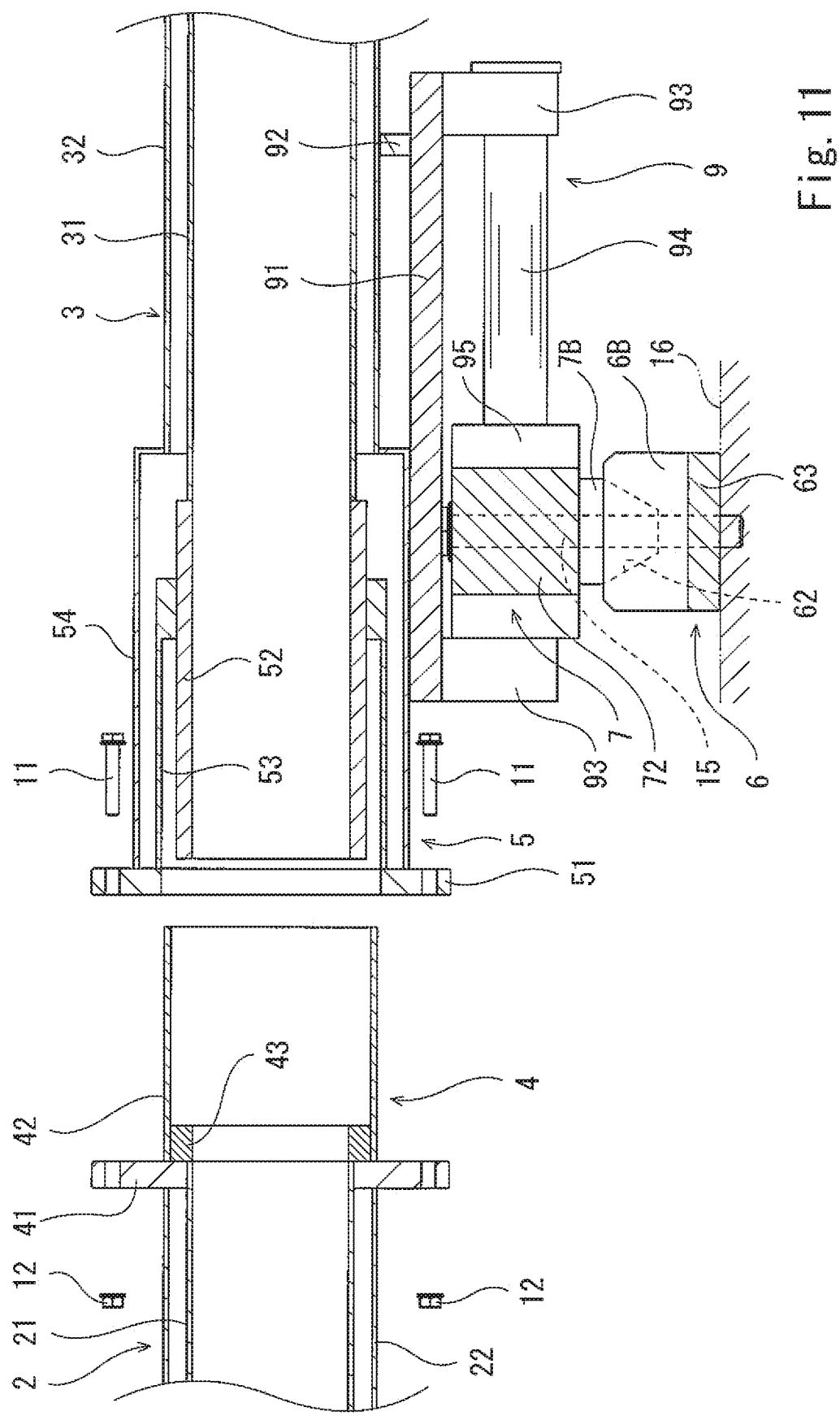

JOINT STRUCTURE

TECHNICAL FIELD

The present invention relates to a joint structure used in cryogenic piping.

BACKGROUND ART

For example, in cryogenic piping for a cryogenic fluid such as LNG or liquid hydrogen, double pipes (tubes) each having a vacuum space between an inner pipe and an outer pipe are used. As a joint structure connecting the double pipes with such a structure to each other, a bayonet joint is used to suppress external heat from being transferred to inside (see Patent Literature 1).

In the bayonet joint, a male bayonet with a first flange is inserted into a female bayonet with a second flange, and the first flange and the second flange are fastened to each other by a bolt and a nut.

CITATION LIST

Patent Literature

Patent Literature 1: Japanese Patent No. 5415090

SUMMARY OF INVENTION

Technical Problem

In the bayonet joint, a clearance formed between the male bayonet and the female bayonet is very small, and the male bayonet is inserted into the female bayonet with a relatively long insertion length. Therefore, it is difficult to insert the male bayonet into the female bayonet.

In view of the above, an object of the present invention is to provide a joint structure which is capable of easily inserting the male bayonet into the female bayonet.

Solution to Problem

To solve the above-described problem, a joint structure connecting a first double pipe and a second double pipe to each other, comprises a male bayonet provided at an end portion of one of the first double pipe and the second double pipe, the male bayonet including a first flange; a female bayonet provided at an end portion of the other of the first double pipe and the second double pipe, the female bayonet including a second flange to be fastened to the first flange; a first positioning member mounted on the first double pipe; a second positioning member mounted on the second double pipe, the second positioning member being positioned with respect to the first positioning member so that a center axis of the male bayonet and a center axis of the female bayonet conform to each other; and a slide mechanism which supports the first positioning member so that the first positioning member is slidable in an axial direction of the first double pipe or supports the second positioning member so that the second positioning member is slidable in an axial direction of the second double pipe.

In accordance with this configuration, in a state in which the second positioning member is positioned with respect to the first positioning member, the male bayonet is insertable into the female bayonet. In this state, the first double pipe and the second double pipe are made close to each other while sliding the first positioning member or the second positioning member by use of the slide mechanism. In this way, the male bayonet can be easily inserted into the female bayonet. In particular, in a case where the first double pipe is fixed to a structure body, and the second double pipe is movable, the second double pipe has only to be pushed-in, after the second positioning member is positioned with respect to the first positioning member.

For example, the first positioning member may be a first ring which is concentric with the first double pipe, and the second positioning member may be a second ring which is concentric with the second double pipe.

One of the first ring and the second ring may have an outward tapered surface which is concentric with the first ring or the second ring and has a diameter reduced from one of the first ring and the second ring toward the other of the first ring and the second ring, and the other of the first ring and the second ring may have an inward tapered surface which is concentric with the first ring or the second ring and contacts the outward tapered surface. In accordance with this configuration, by merely inserting a convex part having the outward tapered surface into a depressed (recessed) part formed by the inward tapered surface, the second positioning member can be positioned with respect to the first positioning member.

For example, the first positioning member may include a plurality of fitting holes which open in a direction perpendicular to the axial direction of the first double pipe, and the second positioning member may include a plurality of pins which are insertable into the plurality of fitting holes, respectively.

Advantageous Effects of Invention

In accordance with the present invention, the male bayonet can be easily inserted into the female bayonet.

BRIEF DESCRIPTION OF DRAWINGS

FIG. 11 is a cross-sectional view showing a state in which the second positioning member is positioned with respect to the first positioning member.

DESCRIPTION OF EMBODIMENTS

Embodiment 1

Figure 1:
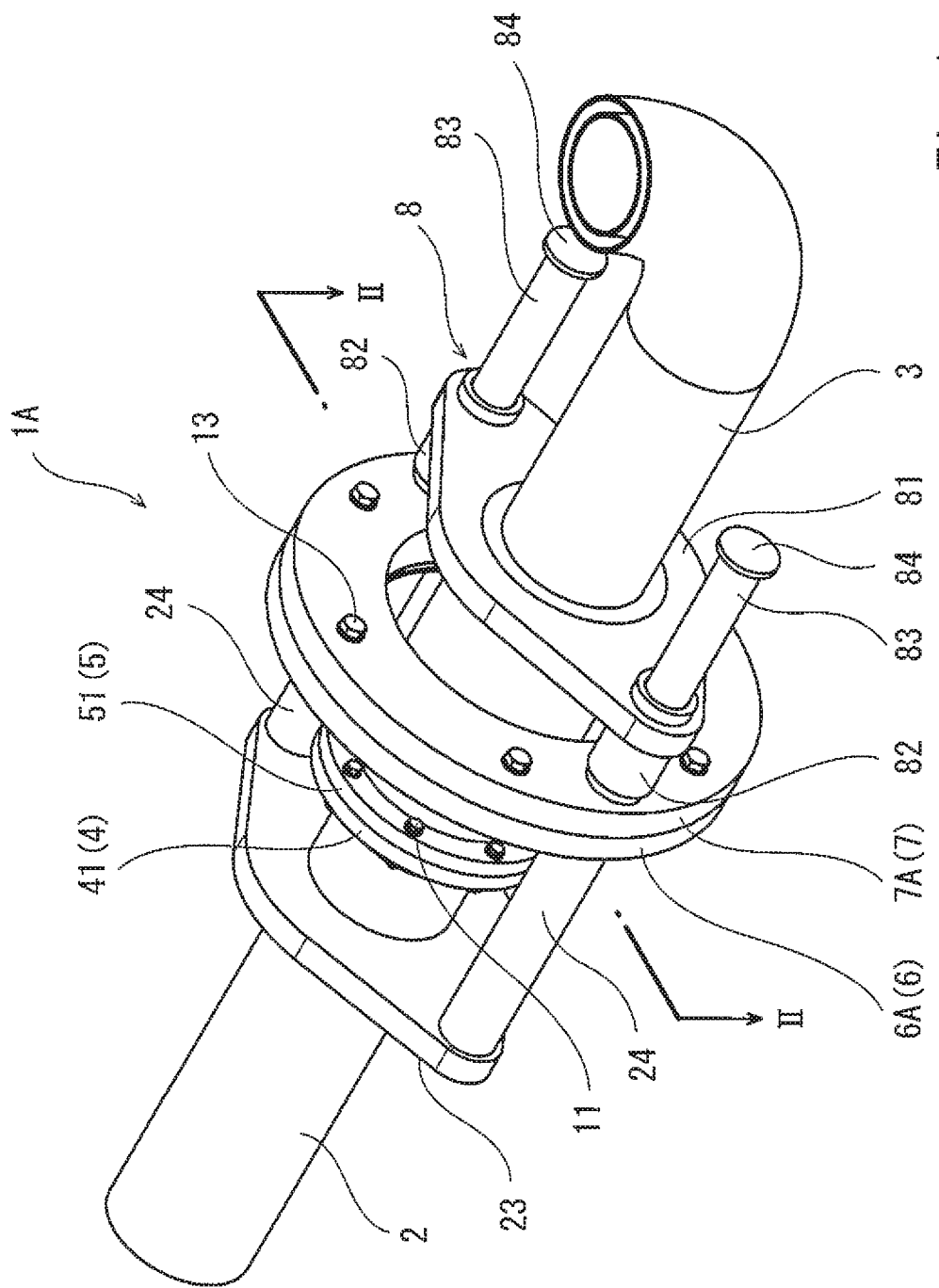
FIG. 1 is a perspective view of a joint structure according to Embodiment 1 of the present invention.
Figure 2:
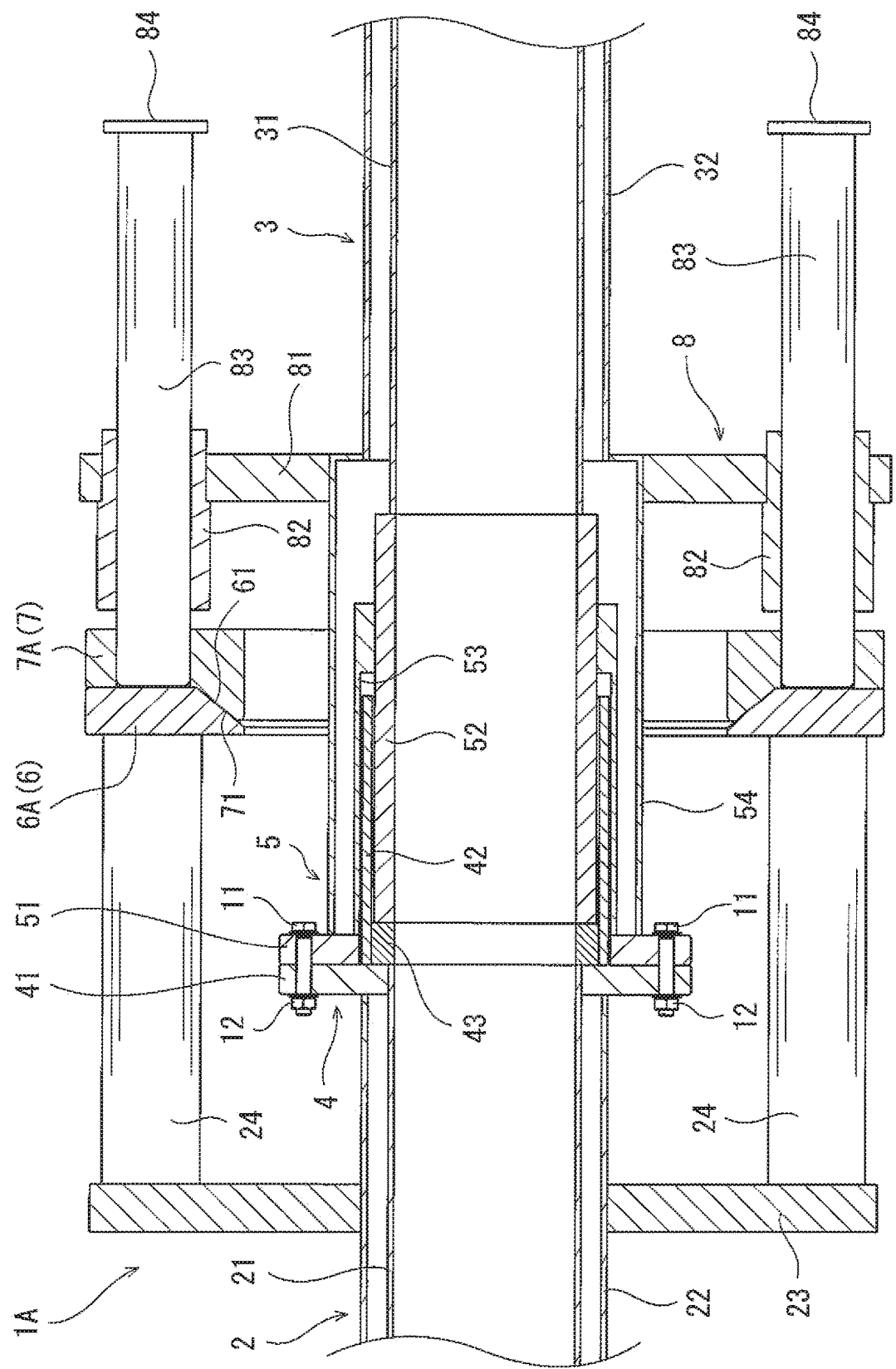
FIG. 2 is a cross-sectional view taken along line II-II of FIG. 1.

FIGS. 1 and 2 show a joint structure 1A according to Embodiment 1 of the present invention. The joint structure 1A is used to connect a first double pipe 2 and a second double pipe 3 to each other.

The first double pipe 2 includes an inner pipe 21 and an outer pipe 22, and a space formed between the inner pipe 21 and the outer pipe 22 is made vacuum by vacuuming using a pump (not shown). Likewise, the second double pipe 3 includes an inner pipe 31 and an outer pipe 32, and a space formed between the inner pipe 31 and the outer pipe 32 is made vacuum by vacuuming using a pump (not shown).

In the present embodiment, the first double pipe 2 is fixed to a structure body (not shown), and the second double pipe 3 is movable. Alternatively, the second double pipe 3 may be fixed to the structure body, and the first double pipe 2 may be movable. Further, both of the first double pipe 2 and the second double pipe 3 may be movable.

For example, the structure body is a hull of a transport vessel (carrier) of a liquefied gas such as LNG or liquid hydrogen. In this case, the first double pipe 2 is a part of a supply pipe extending from a tank mounted on the liquefied gas transport vessel, and the second double pipe 3 is a part of a loading arm placed on a land. Note that the joint structure 1A may be used for other purposes, as a matter of course.

Figure 6:
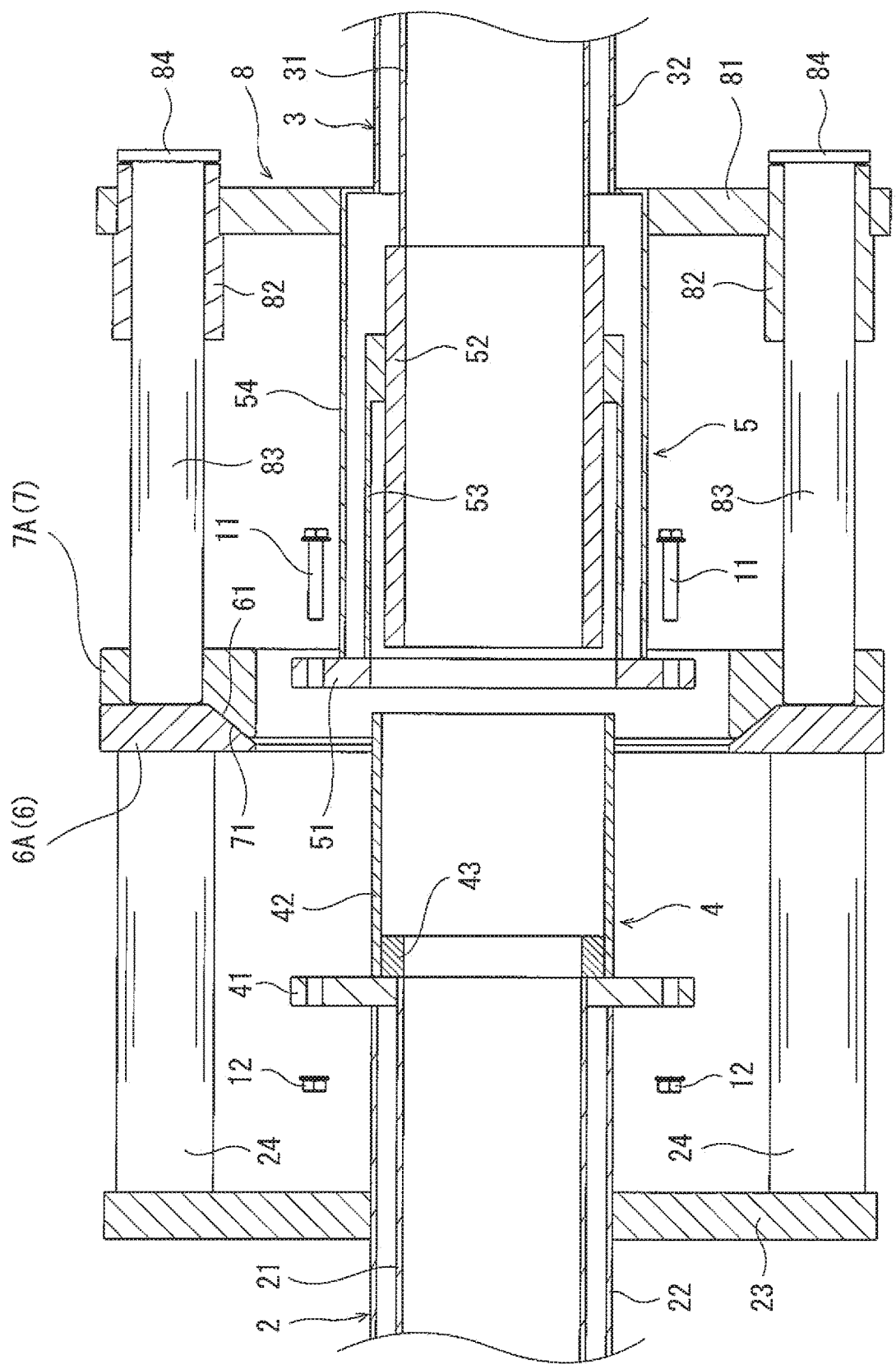
FIG. 6 is a cross-sectional view of the state of FIG. 5.

A male bayonet 4 is provided at the end portion of the first double pipe 2. A female bayonet 5 is provided at the end portion of the second double pipe 3. Alternatively, the male bayonet 4 may be provided at the end portion of the second double pipe 3, and the female bayonet 5 may be provided at the end portion of the first double pipe 2. FIG. 6 shows a state that is just before the male bayonet 4 is inserted into the female bayonet 5.

The male bayonet 4 includes a first flange 41 extending radially outward from the first double pipe 2, and a tubular body 42 protruding in an axial direction of the first double pipe 2 from the first flange 41. The tubular body 42 has an inner diameter larger than that of the inner pipe 21 of the first double pipe 2. A ring 43 with an inner diameter equal to that of the inner pipe 21 is provided at the base part of the tubular body 42.

The female bayonet 5 includes a second flange 51 to be fastened to the first flange 41 of the male bayonet 4 by bolts 11 and nuts 12. The second flange 51 is coupled to the inner pipe 31 of the second double pipe 3 via an inner housing 53 and a tubular body 52 and coupled to the outer pipe 32 of the second double pipe 3 via an outer housing 54. A space formed between the inner housing 53 and the outer housing 54 and between the tubular body 42 and the outer housing 54, is in communication with a space formed between the inner pipe 31 and the outer pipe 32 of the second double pipe 3, and is vacuum.

The tubular body 52 of the female bayonet 5 has an inner diameter equal to that of the inner pipe 31 of the second double pipe 3. Between the tubular body 52 and the inner housing 53, an insertion opening into which the tubular body 42 of the male bayonet 4 is insertable is provided. The tubular body 52 is in contact with the ring 43 of the male bayonet 4, in a state in which the second flange 51 of the female bayonet 5 is fastened to the first flange 41 of the male bayonet 4.

As shown in FIGS. 1 and 2, the joint structure 1A further includes a first positioning member 6 mounted on the first double pipe 2, and a second positioning member 7 mounted on the second double pipe 3. The second positioning member 7 is positioned with respect to the first positioning member 6 so that the center axis of the male bayonet 4 and the center axis of the female bayonet 5 conform to each other.

Figure 3:
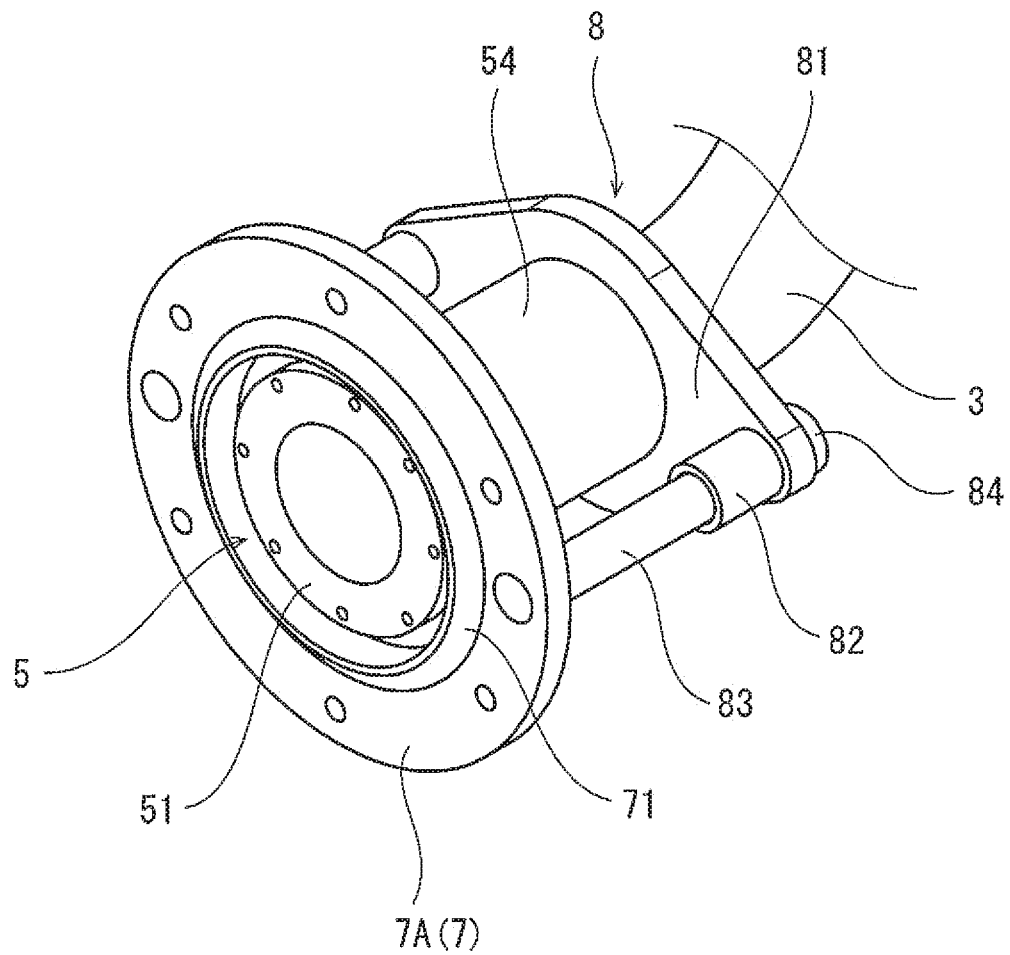
FIG. 3 is a perspective view of a female bayonet.

In the present embodiment, the first positioning member 6 is a first ring 6A which is concentric with the first double pipe 2, while the second positioning member 7 is a second ring 7A which is concentric with the second double pipe 3. In the present embodiment, as shown in FIG. 3, the inner peripheral portion of the second ring 7A has an outward tapered surface 71 which is concentric with the second ring 7A and has a diameter reduced toward the first ring 6A. As shown in FIG. 2, the inner peripheral portion of the first ring 6A has an inward tapered surface 61 which is concentric with the first ring 6A and contacts the outward tapered surface 71 of the second ring 7A. Alternatively, the outer peripheral portion of the second ring 7A may have the outward tapered surface 71, and the outer peripheral portion of the first ring 6A may have the inward tapered surface 61. Further, the first ring 6A may have the outward tapered surface 71 which is concentric with the first ring 6A, and the second ring 7A may have the inward tapered surface 61 which is concentric with the second ring 7A.

The position of the first ring 6A conforms to the position of the tip end of the tubular body 42 in the axial direction of the first double pipe 2 (see FIG. 6). In other words, the first ring 6A surrounds the tip end of the tubular body 42. Alternatively, the first ring 6A may be disposed forward of the tip end of the tubular body 42 (at a location that is closer to the second double pipe 3), or rearward of the tip end of the tubular body 42 (at a location that is closer to the first double pipe 2).

A support plate 23 is secured to the outer pipe 22 of the first double pipe 2, at a location that is distant from the first flange 41 of the male bayonet 4. The support plate 23 has a substantially rhombic shape. Two support columns 24 stand on the both end portions, respectively, of the support plate 23, and extend in the axial direction of the first double pipe 2. The first ring 6A is secured to the tip ends of the support columns 24. In other words, the first ring 6A is mounted on the first double pipe 2 via the support columns 24 and the support plate 23. Note that the shape of the support plate 23 and the number of the support columns 24 can be suitably changed.

The second ring 7A is mounted on the second double pipe 3 via a slide mechanism 8. The slide mechanism 8 supports the second ring 7A so that the second ring 7A is slidable in the axial direction of the second double pipe 3.

Specifically, the slide mechanism 8 includes a support plate 81 secured to the end portion of the outer housing 54 of the female bayonet 5, the end portion being on a side opposite to the second flange 51. Alternatively, the support plate 81 may be secured to the outer pipe 32 of the second double pipe 3. The support plate 23 has a substantially rhombic shape. Two bearings 82 are provided at the both end portions, respectively, of the support plate 81. Shafts 83 extending in the axial direction of the second double pipe 3 are inserted into the bearings 82, respectively. The second ring 7A is secured to the first (one) ends of the shafts 83. Stoppers 84 for preventing disengagement are provided at the second (the other) ends of the shafts 83, respectively. Note that the shape of the support plate 81 and the number of the shafts 83 can be suitably changed.

The second ring 7A is advanceable so that the stoppers 84 contact the bearings 82, respectively, and is retractable so that the second ring 7A contacts the bearings 82. As shown in FIG. 6, in a most advanced state of the second ring 7A, the position of the second ring 7A conforms to the position of the second flange 51 in the axial direction of the second double pipe 3. In other words, the second ring 7A surrounds the second flange 51. In a state in which the second ring 7A which is most advanced is positioned with respect to the first ring 6A, a clearance is formed between the tip end of the tubular body 42 of the male bayonet 4 and the second flange 51 of the female bayonet 5.

Next, a method of connecting the second double pipe 3 to the first double pipe 2 by use of the joint structure 1A will be described.

Figure 4:
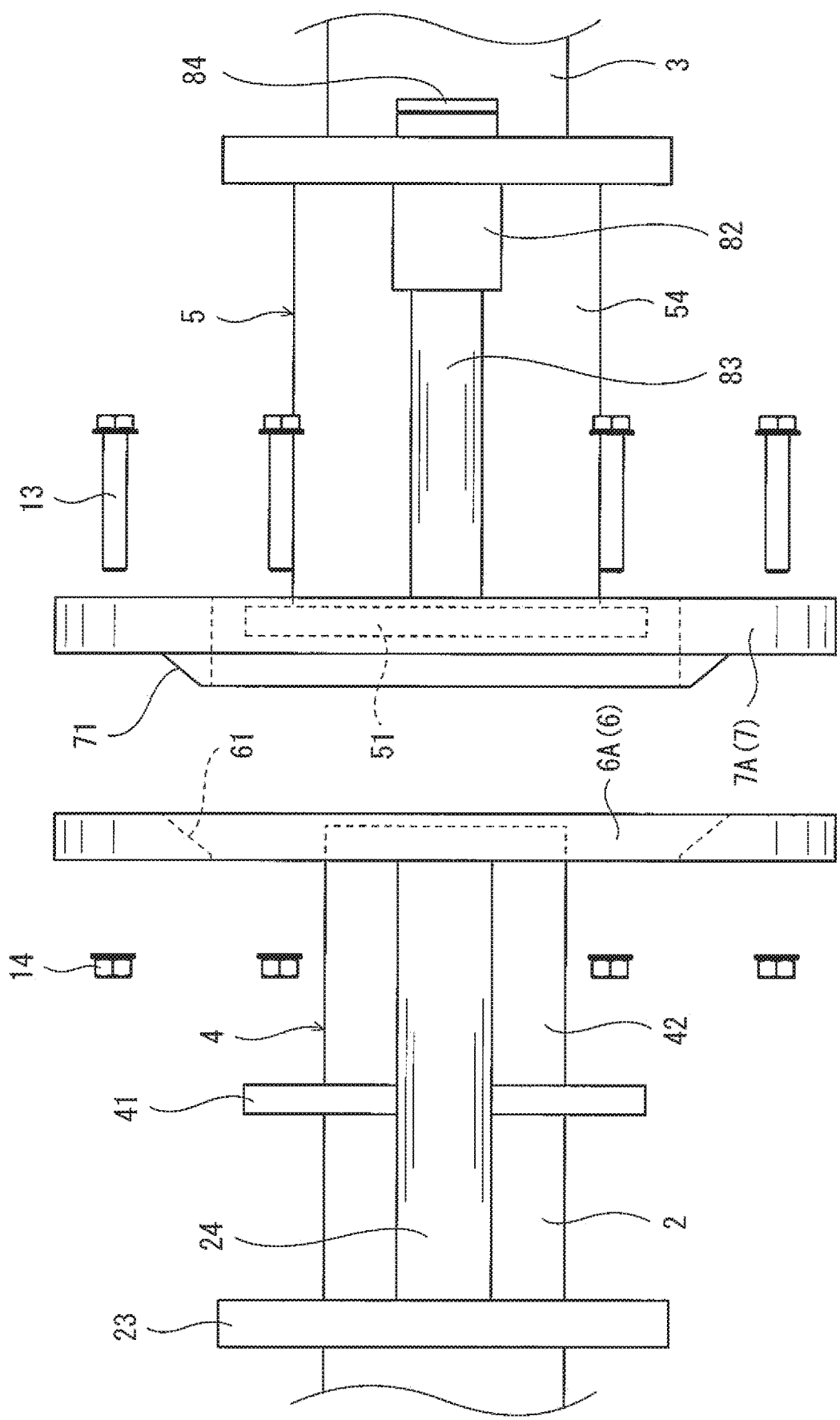
FIG. 4 is a side view showing a state in which a second double pipe is made close to a first double pipe.
Figure 5:
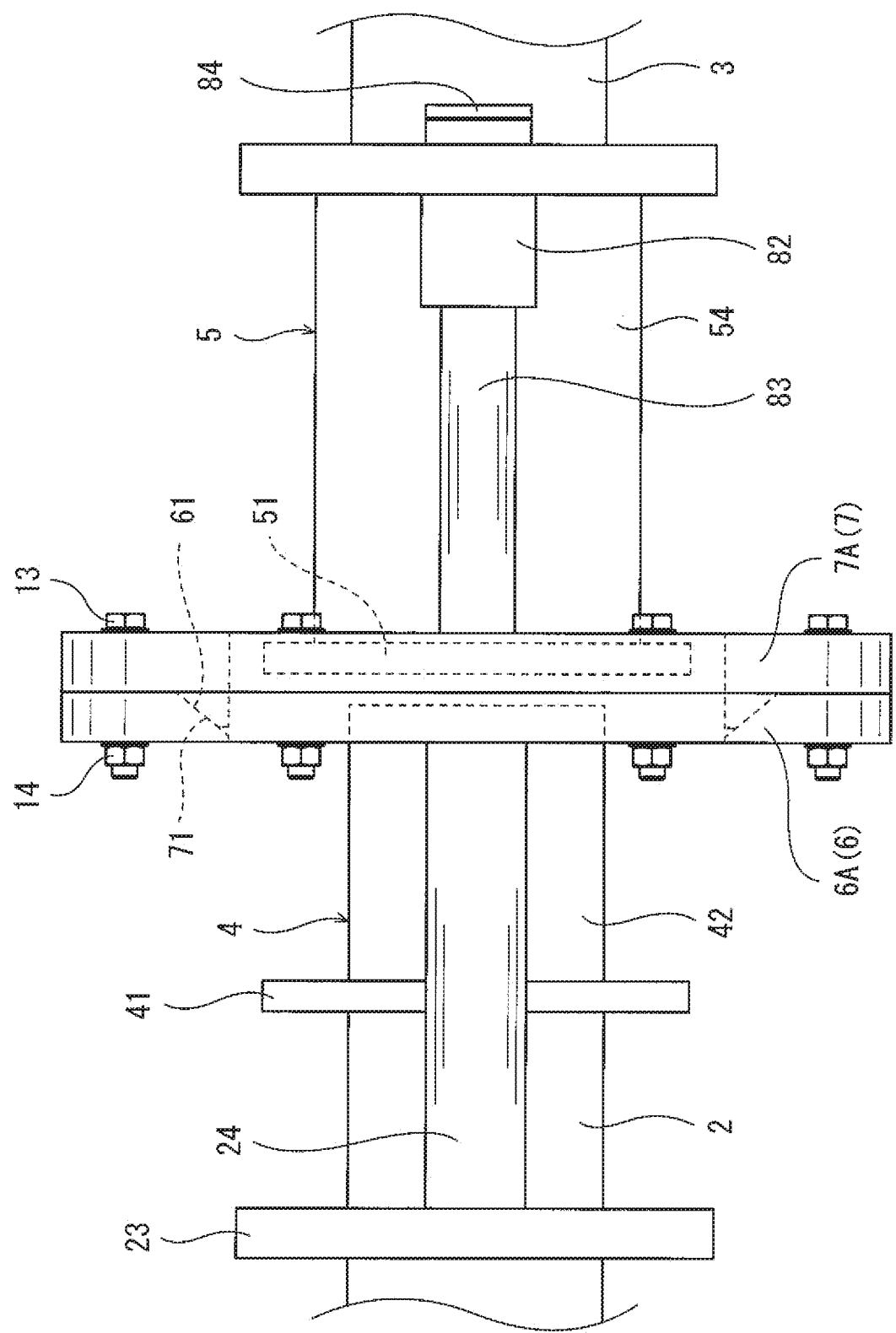
FIG. 5 is a side view showing a state in which a second positioning member is positioned with respect to a first positioning member.

Initially, as shown in FIG. 4, the second ring 7A is most advanced. Then, as shown in FIG. 5, the second ring 7A is positioned with respect to the first ring 6A while inserting a convex part having the outward tapered surface 71 of the second ring 7A into a depressed (recessed) part formed by the inward tapered surface 61 of the first ring 6A. Then, the first ring 6A and the second ring 7A are fastened to each other by the bolts 13 and the nuts 14.

As shown in FIG. 6, in a state in which the second ring 7A is positioned with respect to the first ring 6A, the male bayonet 4 is insertable into the female bayonet 5. In this state, the second double pipe 3 is made close to the first double pipe 2 while sliding the second ring 7A with respect to the second double pipe 3 by use of the slide mechanism 8, and the male bayonet 4 is inserted into the female bayonet 5. Then, the first flange 41 of the male bayonet 4 and the second flange 51 of the female bayonet 5 are fastened to each other by the bolts 11 and the nuts 12.

As described above, in the joint structure 1A of the present embodiment, the male bayonet 4 can be easily inserted into the female bayonet 5 by use of the slide mechanism 8, in a state in which the second ring 7A is positioned with respect to the first ring 6A. In particular, in the present embodiment, since the first double pipe 2 is fixed, and the second double pipe 3 is movable, the second double pipe 3 has only to be pushed-in, after the second ring 7A is positioned with respect to the first ring 6A.

In addition, in the present embodiment, since the second ring 7A has the outward tapered surface 71 and the first ring 6A has the inward tapered surface 61, the second ring 7A can be positioned with respect to the first ring 6A, merely by inserting the convex part having the outward tapered surface 71 into the depressed (recessed) part formed by the inward tapered surface 61.

MODIFIED EXAMPLE

In a reversed configuration of the above-described embodiment, the second ring 7A may be fixed to the second double pipe 3, and the first ring 6A may be mounted on the first double pipe 2 via the slide mechanism 8. That is, the slide mechanism 8 may support the first ring 6A so that the first ring 6A is slidable in the axial direction of the first double pipe 2.

Instead of using the outward tapered surface 71 and the inward tapered surface 61, clearances formed between the bolts 13 and through-holes for the bolts 13 which are formed in the first ring 6A and the second ring 7A may be set to be very small to position the second ring 7A with respect to the first ring 6A.

Embodiment 2

Figure 7:
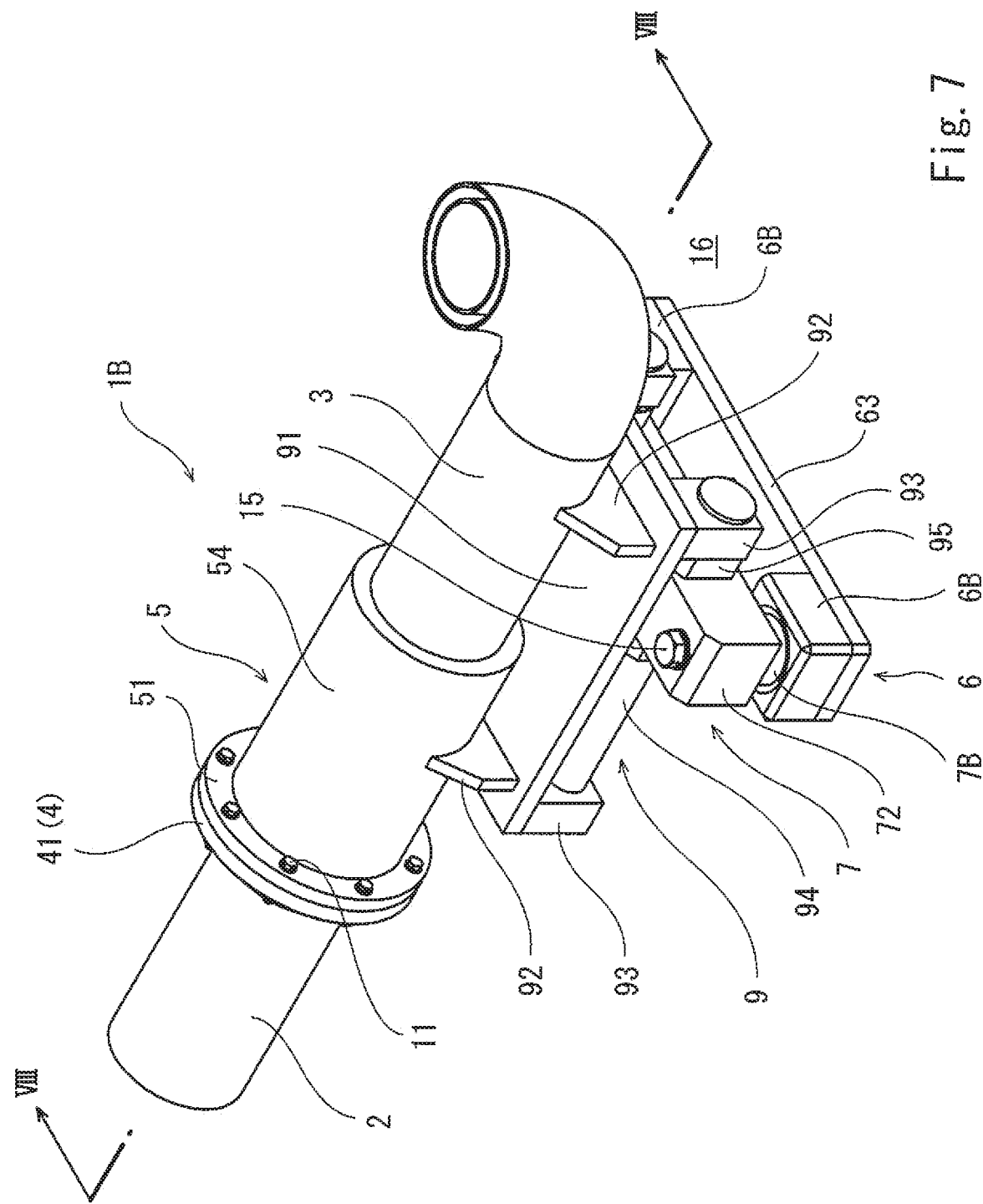
FIG. 7 is a perspective view of a joint structure according to Embodiment 2 of the present invention.
Figure 8:
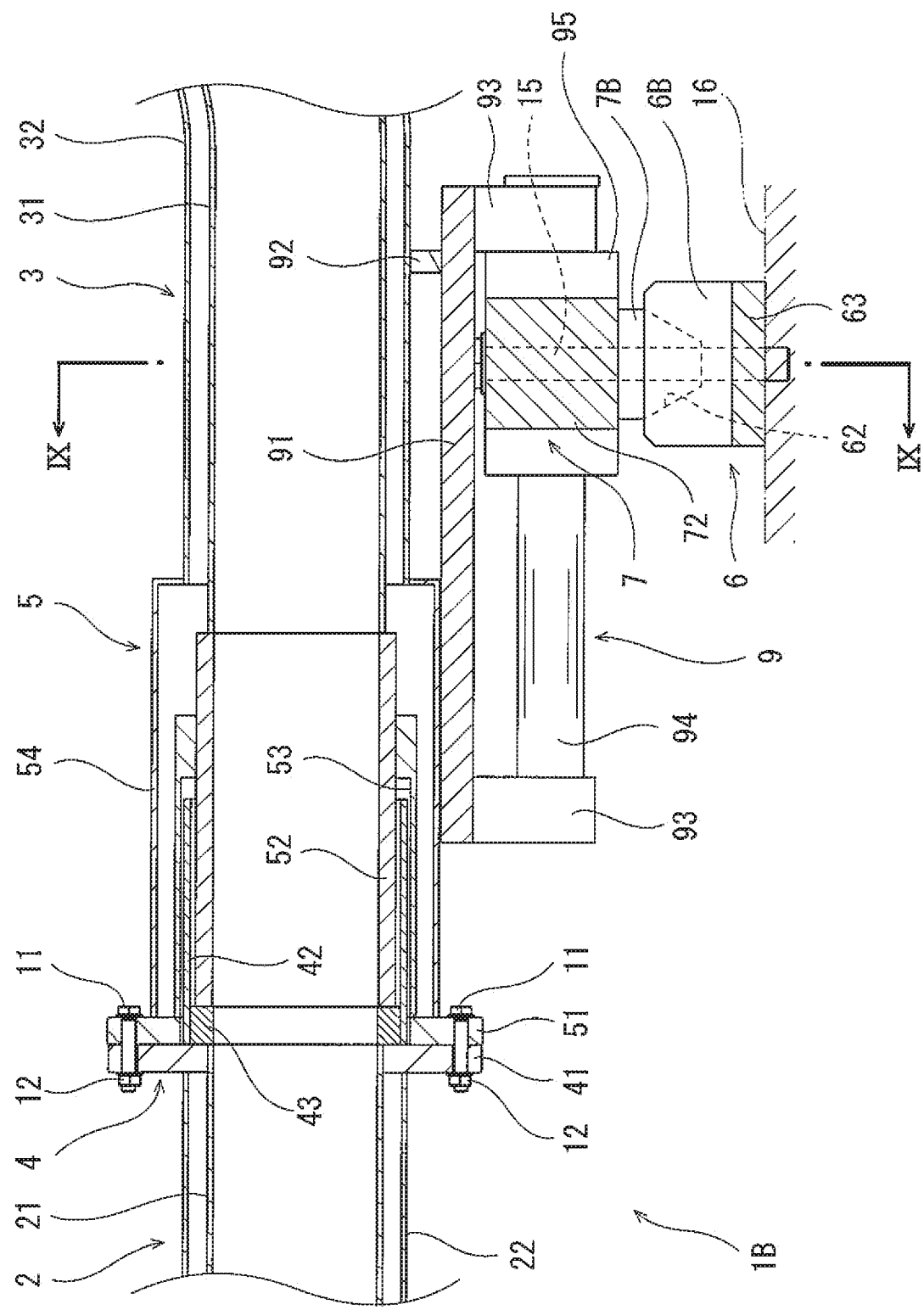
FIG. 8 is a cross-sectional view taken along line VIII-VIII of FIG. 7.
Figure 9:
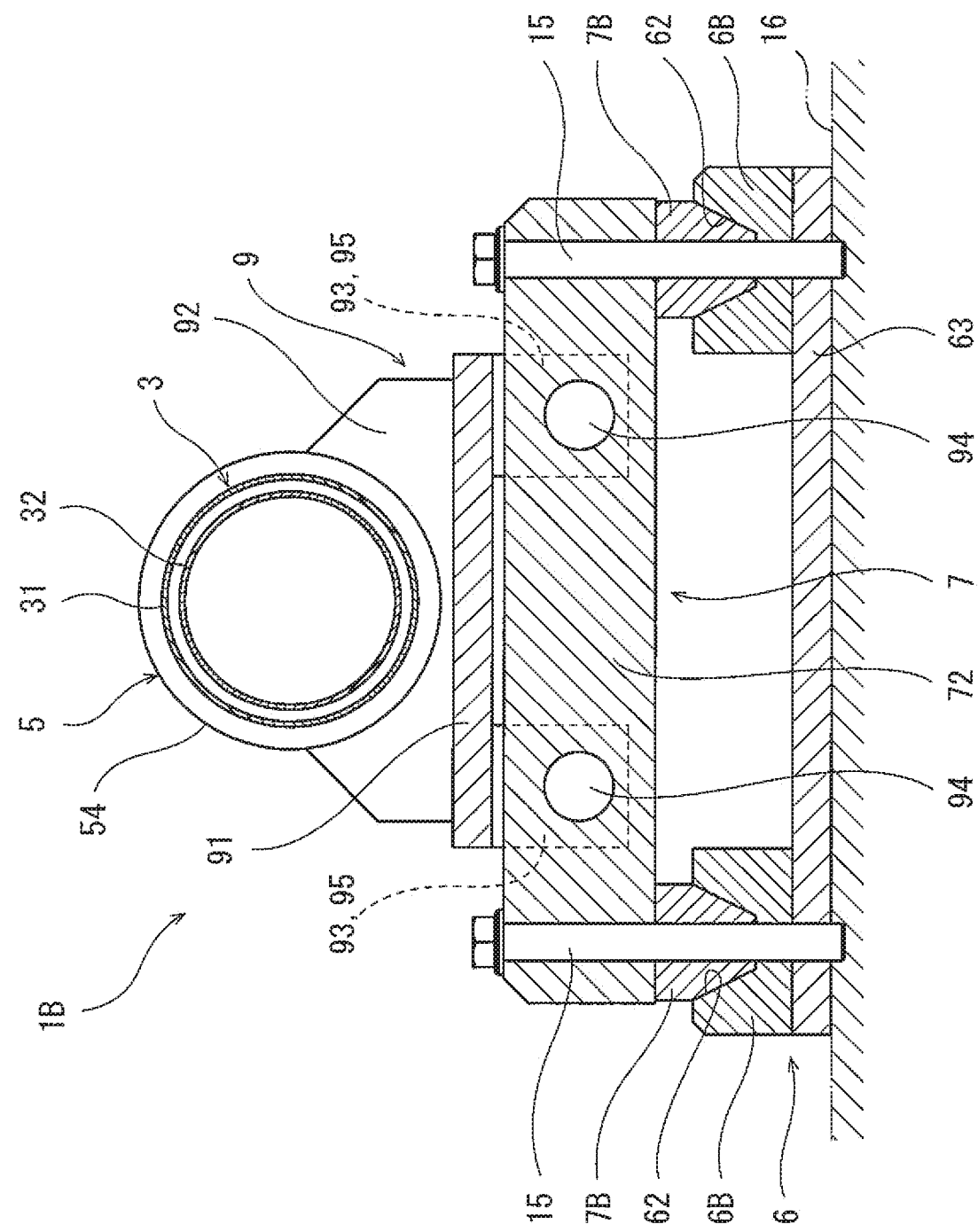
FIG. 9 is a cross-sectional view taken along line IX-IX of FIG. 8.

FIGS. 7 to 9 show a joint structure 1B according to Embodiment 2 of the present invention. In the present embodiment, the same constituents as those of Embodiment 1 are designated by the same reference symbols, and will not be described in repetition.

As in Embodiment 1, in the present embodiment, the male bayonet 4 is provided at the end portion of the first double pipe 2 fixed, and the female bayonet 5 is provided at the end portion of the second double pipe 3 which is movable. Alternatively, the male bayonet 4 may be provided at the end portion of the second double pipe 3 and the female bayonet 5 may be provided at the end portion of the first double pipe 2.

In the present embodiment, the first positioning member 6 is mounted on the first double pipe 2 via a structure body 16 to which the first double pipe 2 is fixed, and the second positioning member 7 is mounted on the second double pipe 3 via a slide mechanism 9. The first positioning member 6 is disposed forward of the first flange 41 of the male bayonet 4 at a great distance from the first flange 41 of the male bayonet 4 (at a location that is closer to the second double pipe 3).

Specifically, the first positioning member 6 includes a base plate 63 with a rectangular shape, extending in a direction perpendicular to the axial direction of the first double pipe 2, and two blocks 6B secured to the both end portions, respectively, of the base plate 63. The base plate 63 is fixed to the structure body 16. The blocks 6B are formed with fitting holes 62, respectively, which open in a direction perpendicular to the axial direction of the first double pipe 2 and the extending direction of the base plate 63. Alternatively, the first positioning member 6 may be a single bar which extends in the direction perpendicular to the axial direction of the first double pipe 2 and is provided with two fitting holes 62.

The second positioning member 7 includes a bar 72 extending in the direction perpendicular to the axial direction of the second double pipe 3, and two pins 7B secured to the both end portions, respectively, of the bar 72. The bar 72 is parallel to the base plate 63 of the first positioning member 6. The pins 7B are inserted into the fitting holes 62 of the corresponding blocks 6B, respectively, of the first positioning member 6. Each of the pins 7B has a tapered tip end. Each of the fitting holes 62 has a diameter reduced toward the bottom to be fitted to the corresponding pin 7B. Alternatively, the number of the pins 7B and the number of the fitting holes 62 may be three or more.

The slide mechanism 9 supports the second positioning member 7 so that the second positioning member 7 is slidable in the axial direction of the second double pipe 3. Specifically, the slide mechanism 9 includes a base plate 91 which is interposed between the second positioning member 7 and the second double pipe 3 and is parallel to the axial direction of the second double pipe 3. The base plate 91 is coupled to the outer pipe 32 of the second double pipe 3 and the outer housing 54 of the female bayonet 5 via a pair of brackets 92.

The bar 72 of the second positioning member 7 is penetrated by two shafts 94 extending in the axial direction of the second double pipe 3. Note that the number of the shafts 94 may be suitably changed. The both end portions of each of the shafts 94 are secured to the base plate 91 by holders 93, respectively. The bar 72 is provided with two bearings 95 inserted by the shafts 94.

The second positioning member 7 is advanceable so that the bearings 95 contact the front (left in FIG. 8) holders 93 and is retractable so that the bearings 95 contact the rear (right in FIG. 8) holders 93. As shown in FIG. 11, in a state in which the second positioning member 7 which is most advanced is positioned with respect to the first positioning member 6, a clearance is formed between the tip end of the tubular body 42 of the male bayonet 4 and the second flange 51 of the female bayonet 5.

Next, a method of connecting the second double pipe 3 to the first double pipe 2 by use of the joint structure 1B will be described.

Figure 10:
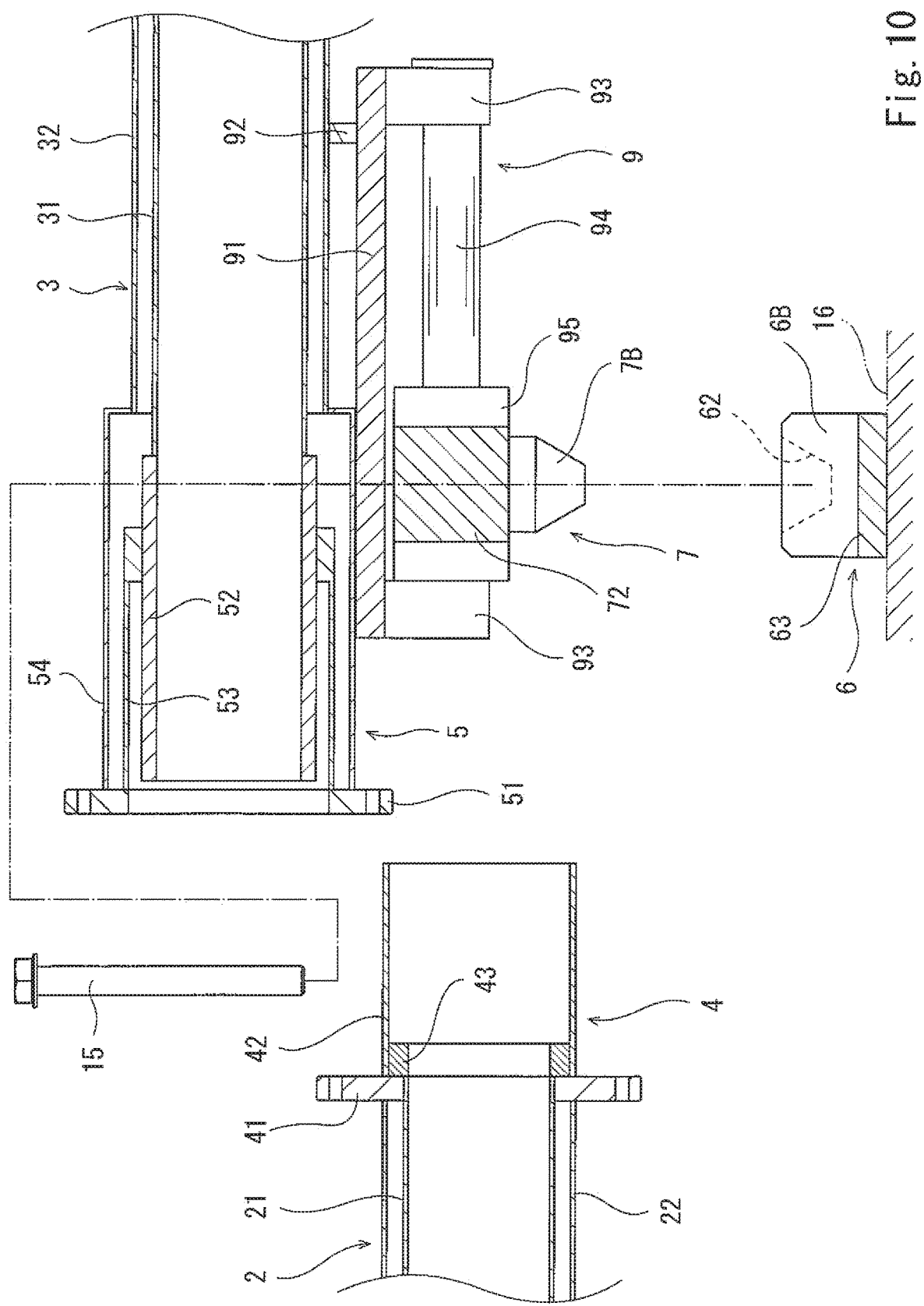
FIG. 10 is a side view showing a state in which the second double pipe is made close to the first double pipe.

Initially, as shown in FIG. 10, the second positioning member 7 is most advanced. Then, as shown in FIG. 11, the pins 7B of the second positioning member 7 are inserted into the fitting holes 62, respectively, of the first positioning member 6, and thus the second positioning member 7 is positioned with respect to the first positioning member 6. Then, the second positioning member 7 is fastened to the first positioning member 6 by bolts 15.

In a state in which the second positioning member 7 is positioned with respect to the first positioning member 6, the male bayonet 4 is insertable into the female bayonet 5. In this state, the second double pipe 3 is made close to the first double pipe 2 while sliding the second positioning member 7 with respect to the second double pipe 3 by use of the slide mechanism 9, and the male bayonet 4 is inserted into the female bayonet 5. Then, the first flange 41 of the male bayonet 4 and the second flange 51 of the female bayonet 5 are fastened to each other by the bolts 11 and the nuts 12.

As described above, in the joint structure 1B of the present embodiment, the male bayonet 4 can be easily inserted into the female bayonet 5 by use of the slide mechanism 9, in a state in which the second positioning member 7 is positioned with respect to the first positioning member 6. In particular, since the first double pipe 2 is fixed, and the second double pipe 3 is movable, the second double pipe 3 has only to be pushed-in after the second positioning member 7 is positioned with respect to the first positioning member 6.

MODIFIED EXAMPLE

In a reversed configuration of the above-described embodiment, the second positioning member 7 may be fixed to the second double pipe 3 and the first positioning member 6 may be mounted on the first double pipe 2 via the slide mechanism 9 and the structure body 16. That is, the slide mechanism 9 may support the first positioning member 6 on the structure body 16 so that the first positioning member 6 is slidable in the axial direction of the first double pipe 2.

In a reversed configuration of the above-described embodiment, the second positioning member 7 mounted on the second double pipe 3 may include the two fitting holes 62, and the first positioning member 6 mounted on the first double pipe 2 may include the two pins 7B.

Other Embodiments

The present invention is not limited to the above-described embodiments, and various modifications can be made within the scope of the invention.

For example, the structure of the male bayonet 4 and the structure of the female bayonet 5 are not limited to those of FIG. 6, and various structures can be used.

REFERENCE SIGNS LIST 1A, 1B joint structure
2 first double pipe
3 second double pipe
4 male bayonet
41 first flange
5 female bayonet
51 second flange
6 first positioning member
6A first ring
62 fitting hole
7 second positioning member
7A second ring
7B pin
8, 9 slide mechanism

The invention claimed is:

1. A joint structure connecting a first double pipe and a second double pipe to each other, the joint structure comprising:
   a male bayonet provided at an end portion of one of the first double pipe and the second double pipe, the male bayonet including a first flange and a first tubular body fixed to the first flange, the first tubular body protruding from the first flange toward the other of the first double pipe and the second double pipe;
   a female bayonet provided at an end portion of the other of the first double pipe and the second double pipe, the female bayonet including a second flange to be fastened to the first flange, an inner housing, an outer housing, and a second tubular body, the second flange being coupled to an inner pipe of the other of the double pipes via the inner housing and the second tubular body and coupled to an outer pipe of the other of the double pipes via the outer housing, the female bayonet having an insertion opening which is provided between the second tubular body and the inner housing and into which the first tubular body is insertable;
   a first positioning member mounted on the first double pipe;
   a second positioning member mounted on the second double pipe, the second positioning member being positioned with respect to the first positioning member so that a center axis of the male bayonet and a center axis of the female bayonet conform to each other; and
   a slide mechanism which supports the first positioning member so that the first positioning member is slidable in an axial direction of the first double pipe or supports the second positioning member so that the second positioning member is slidable in an axial direction of the second double pipe.

2. The joint structure according to claim 1,
   wherein the first double pipe is fixed to a structure body and the second double pipe is movable.

3. The joint structure according to claim 1,
   wherein the first positioning member is a first ring which is concentric with the first double pipe, and
   wherein the second positioning member is a second ring which is concentric with the second double pipe.

4. The joint structure according to claim 1,
   wherein the first positioning member includes a plurality of fitting holes which open in a direction perpendicular to the axial direction of the first double pipe, and
   wherein the second positioning member includes a plurality of pins which are insertable into the plurality of fitting holes, respectively.

5. A joint structure connecting a first double pipe and a second double pipe to each other, the joint structure comprising:
   a male bayonet provided at an end portion of one of the first double pipe and the second double pipe, the male bayonet including a first flange;
   a female bayonet provided at an end portion of the other of the first double pipe and the second double pipe, the female bayonet including a second flange to be fastened to the first flange;

a first positioning member mounted on the first double pipe;

a second positioning member mounted on the second double pipe, the second positioning member being positioned with respect to the first positioning member so that a center axis of the male bayonet and a center axis of the female bayonet conform to each other; and a slide mechanism which supports the first positioning member so that the first positioning member is slidable in an axial direction of the first double pipe or supports the second positioning member so that the second positioning member is slidable in an axial direction of the second double pipe, wherein the first positioning member is a first ring which is concentric with the first double pipe, wherein the second positioning member is a second ring which is concentric with the second double pipe, and wherein one of the first ring and the second ring has an outward tapered surface which is concentric with the first ring or the second ring and has a diameter reduced from one of the first ring and the second ring toward the other of the first ring and the second ring, and the other of the first ring and the second ring has an inward tapered surface which is concentric with the first ring or the second ring and contacts the outward tapered surface.

* * * * *